United States Patent [19]

Schneider

[11] 4,253,333

[45] Mar. 3, 1981

[54] ROTARY METER

[75] Inventor: George W. Schneider, Huntingdon Valley, Pa.

[73] Assignee: The Singer Company, Stamford, Conn.

[21] Appl. No.: 78,334

[22] Filed: Sep. 24, 1979

[51] Int. Cl.³ .............................................. G01F 3/08
[52] U.S. Cl. .................................................... 73/253
[58] Field of Search ................................ 73/253, 257

[56] References Cited

U.S. PATENT DOCUMENTS

| 3,304,781 | 2/1967 | Stevenson | 73/253 |
| 3,482,446 | 9/1969 | Wrinkle et al. | 73/257 |
| 4,109,528 | 8/1978 | Schneider, Jr. | 73/253 |

*Primary Examiner*—Herbert Goldstein
*Attorney, Agent, or Firm*—David L. Davis; Robert E. Smith; Edward L. Bell

[57] ABSTRACT

In a rotary meter having a self contained cartridge including a stationary core member, a rotor and a rotating cylindrical gate, a removable spider member is utilized to accurately position the cartridge within the meter casing prior to final assembly. A replenishable lubricant reservoir in the stationary core member provides lubrication for the various bearings within the meter.

18 Claims, 5 Drawing Figures

ROTARY METER

BACKGROUND OF THE INVENTION

This invention relates to rotary meters and more particularly to novel structure in a rotary meter that enables its various components to be readily and accurately positioned relative to one another prior to complete assembly of the meter and which enables the various bearings within the meter to be lubricated during the life of the meter without the necessity of disassembling the meter.

Accordingly, one object of this invention is to provide an improved rotary meter.

Another object of this invention is to provide a novel rotary meter structure that enables its various components to be readily and accurately positioned relative to one another during assembly of the meter.

Still another object of this invention is to provide a novel rotary meter structure that enables the various bearings within the meter to be adequately lubricated during the life of the meter without the necessity of disassembling the meter.

SUMMARY OF THE INVENTION

Briefly described, the present invention comprises a rotary meter that includes a casing having a cylindrical bore therein to provide a base at one end thereof and an opening at the other end thereof. A self contained cartridge is mounted within the cylindrical bore and includes a stationary core member having a first support journal and a second support journal, respectively, extending from opposite ends thereof, a rotor, and a cylindrical rotatable gate that is geared with the rotor to rotate in synchronism with the rotor. A bore in the base of the casing receives the first journal with the second journal extending beyond the open end of the casing. Locking means contained in the base enables the first journal to be locked in the base to thereby position the cartridge within the casing. A spider member having an opening therein for receiving the second journal is temporarily coupled to the open end of the casing to enable the cartridge to be accurately positioned within the casing before the first journal is locked in the base of the casing. An end cover having an opening therein for receiving the second journal is secured to the open end of the casing after the cartridge has been accurately positioned within the casing and the spider member removed. The rotor and cylindrical gate are rotatably mounted on the core member by suitable means such as bearings. The core member contains a hollow chamber containing a lubricant and passage means between the lubricant containing hollow portion and the rotatable mounting means enables lubrication of the rotatable mounting means during operation of the meter. A passageway in the core and the casing communicates with the hollow chamber to enable the lubricant therein to be replenished from the exterior of the meter casing.

BRIEF DESCRIPTION OF THE DRAWINGS

The various features, objects and advantages of the present invention will be readily apparent from the following detailed description taken in conjunction with the following drawings, wherein like reference characters designate like or corresponding parts throughout the several views, and wherein.

DESCRIPTION OF THE INVENTION

Figure 1:
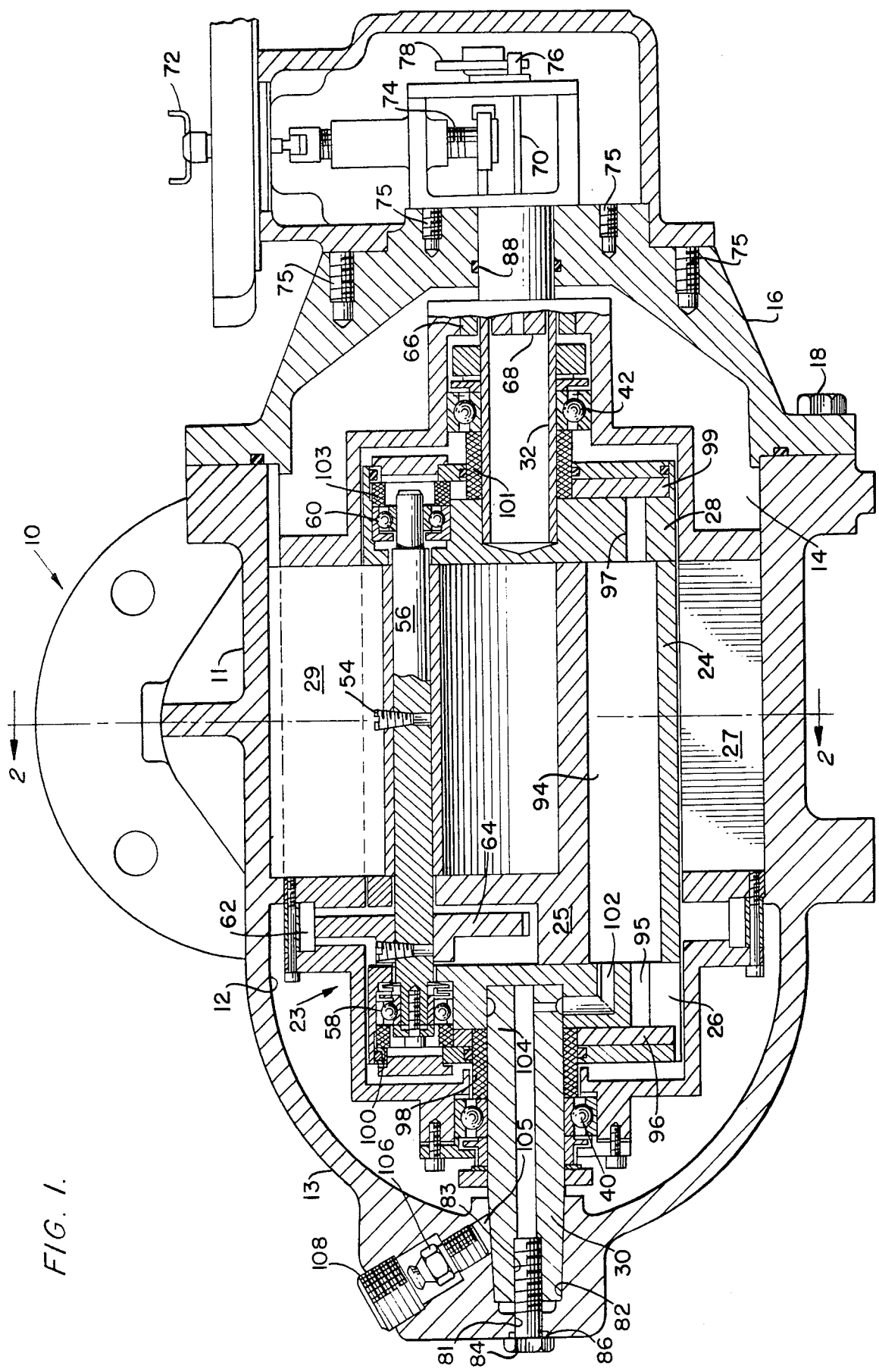
FIG. 1 is a sectional side elevation showing a preferred embodiment of the invention.

The embodiment of the present invention is illustrated in the drawings in conjunction with a positive displacement rotary meter 10 that can be used to measure any fluid, but for purposes of this description gas measurement is presumed. The basic features of the meter 10 are briefly described herein, but for a more detailed description reference may be had to U.S. Pat. Nos. 4,109,528, 3,554,032 and 3,482,446 the contents of which are incorporated herein by reference.

Figure 2:
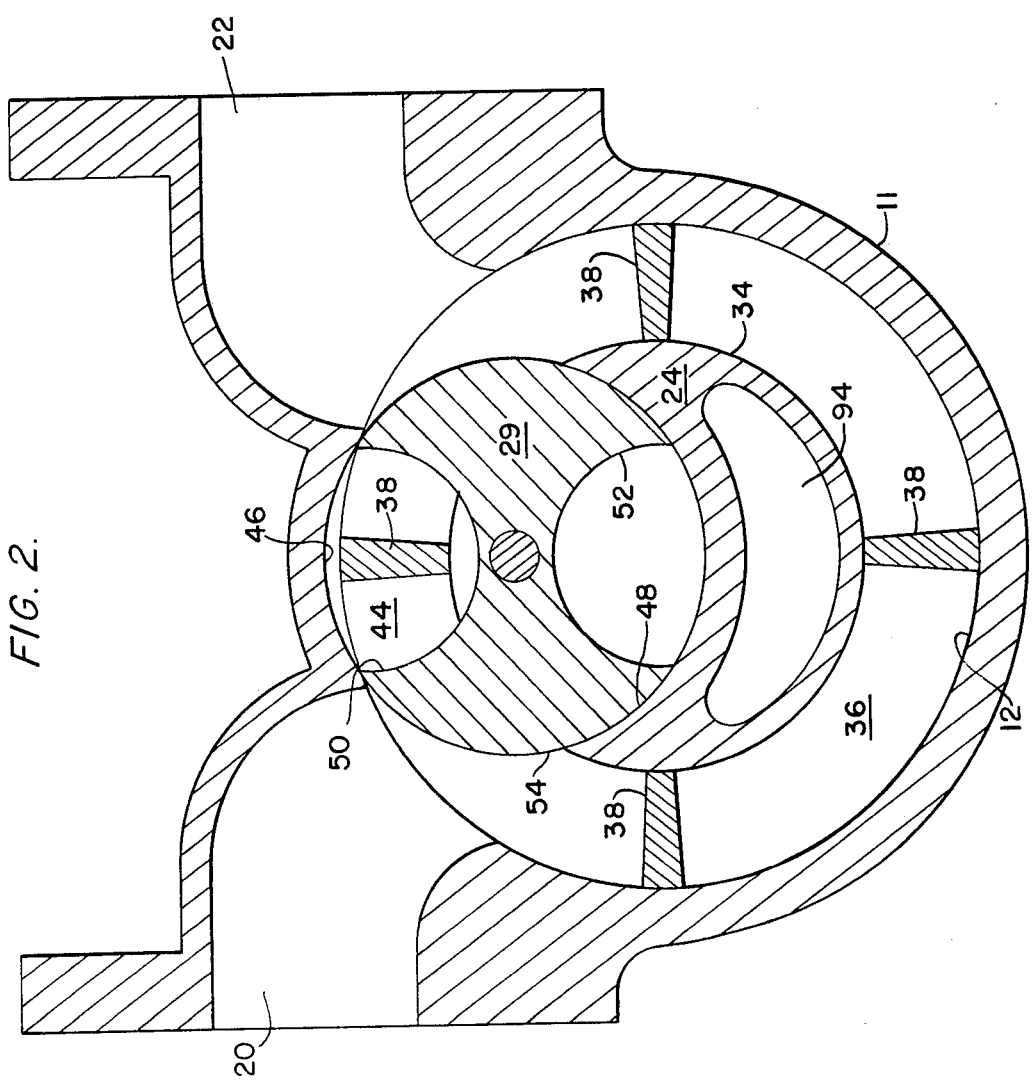
FIG. 2 is a transverse sectional view taken substantially on the lines 2—2 as shown in FIG. 1.

The meter 10 illustrated in FIGS. 1 and 2 includes a casing 11 having a cylindrical bore 12 therein to provide a base portion 13 at one end thereof and opening 14 at the other end thereof. The open end 14 of the casing 11 is closed by a bonnet 16 sealingly attached to the open end 14 of the casing 11 by suitable fasteners 18. The meter 10 has an inlet passage 20 and an outlet passage 22 as best seen in FIG. 2.

A self contained cartridge 23 is mounted within the meter 10 and includes a stationary core 25, a rotor 27 and a cylindrical rotating gate 29. The stationary core comprises a crescent shaped portion 24, a back bearing plate 26, a front bearing plate 28, a tapered back support journal 30 and a front support journal 32. The crescent shaped portion 24 of the core 25 has an outer wall surface 34 shown in FIG. 2 that is concentric with the internal wall surface of the cylindrical bore 12 to define an arcuate channel or passage 36 therebetween that communicates with the inlet 20 and outlet 22 passages. The arcuate channel 36 receives the vanes 38 of the rotor 27 which is rotatably mounted on the back support journal 30 and the front support journal 32 by bearings 40 and 42 respectively. A cylindrical offset cavity 44 intersects the arcuate channel 36 between the fluid inlet 20 and the fluid outlet 22 and is defined by a concave cylindrical surface 46 in the wall of the cylindrical bore 12 and the concave cylindrical surface 48 formed on the inside of the crescent shaped portion 24 of the stationary core 25. The rotary gate 29 is mounted to turn in the cylindrical cavity 44 with its outer cylindrical surface 54 in close proximity to the surfaces 46 and 48. The surface 54 of the rotary gate is interrupted to provide entrance openings 50 and 52 formed on diametrically opposite sides of the gate 29 so as to form separate open spaces or pockets to permit passage of the vanes 38 of the rotor 27 while at the same time preventing leakage of gas between the inlet 20 and the outlet 22 in a well known manner. The gate 29 is secured to a shaft 56 by suitable fastening means 54 with opposite ends of the shaft 56 being rotatably mounted onto the stationary core member 25 by way of bearings 58 and 60 carried by the back bearing plate 26 and the front bearing plate 28, respectively. The axis of rotation of the gate 29 is parallel to the axis of rotation of the rotor 27 which, in turn, is coincident to the central axis of the cylindrical bore 12. As described in detail in U.S. Pat.

No. 3,554,032 an external spur gear 64 secured to the gate 29 shaft 56 meshes with an internal spur gear 62 on the rotor 27 to effect synchronous rotation of the rotor 27 and the gate 29 to assure periodic registry of the vanes 28 in the pockets of the gate 29 as the rotor 27 and gate 29 rotate within the casing 11.

The front portion of the rotor 27 adjacent to the bonnet 16 (FIG. 1) contains a ring type magnet 66 that surrounds the front support journal 32 and which magnet 66 rotates as the rotor 27 rotates. The front support journal is hollow and contains an output shaft 70 therein which contains a cylindrical magnet 68 that is surrounded by the rotor 27 ring magnet 66. Both magnets 66 and 68 are magnetized with a like number of North and South magnetic poles and are magnetically coupled through the non-magnetic front support journal 32 so that the output shaft 70 is driven in substantially exact synchronism with the rotating ring magnet 66. A mechanism 73 for driving a counter (not shown) or other readout device is conveniently mounted on the bonnet 16 by suitable fastening means 75. Thus the output shaft 70 drives the shaft 74 and coupling 72 through speed reducing gears 76, 78 and 80. Any suitable readout device (not shown) can be driven by the coupling 72.

In operation the meter 10 inlet 20 and outlet 22 are connected to fluid carrying piping (not shown). Fluid under pressure enters the inlet 20 and flows into the arcuate channel 36 causing the rotor 27 to rotate in a counter clockwise direction as shown in FIG. 2. The gearing 62 and 64 between the rotor 27 and the gate 29 turns the pocketed gate 29 in a counter clockwise direction at twice the speed of the rotor 27. The pocketed gate 29 prevents direct fluid flow from the inlet 20 to the outlet 22 and requires the fluid to flow through the arcuate channel 36 to the outlet 22. Each of the rotor 27 vanes 38 is received in one of the gate 29 pockets as it passes from a position near the outlet 22 to a position near the inlet 20. Rotation of the rotor 27 is transmitted to the coupling 72 in a manner as described hereinabove.

As shown in FIG. 1, the tapered back support journal 30 is received in a tapered support bore 82 in the base portion 13 of the casing 11. A locking screw 84 passes through an opening 81 in the base portion 13 and threadedly engages a threaded bore 83 in the back support journal 30. A ring seal 86 provides an air tight fit between the locking screw 84 and the base portion 13 of the casing 11. As will be apparent, rotation of the locking screw 84 to increase the threaded engagement with the tapered support journal 30 forces the tapered back support journal 20 further into the tapered support bore 82 until the stationary core member 25 becomes securely positioned within the casing 11. Removal of the bonnet 16 and the locking screw 84 permits the self contained cartridge 23 including the core 25, rotor 27 and gate 29 to be removed from the casing 11.

Figure 4:
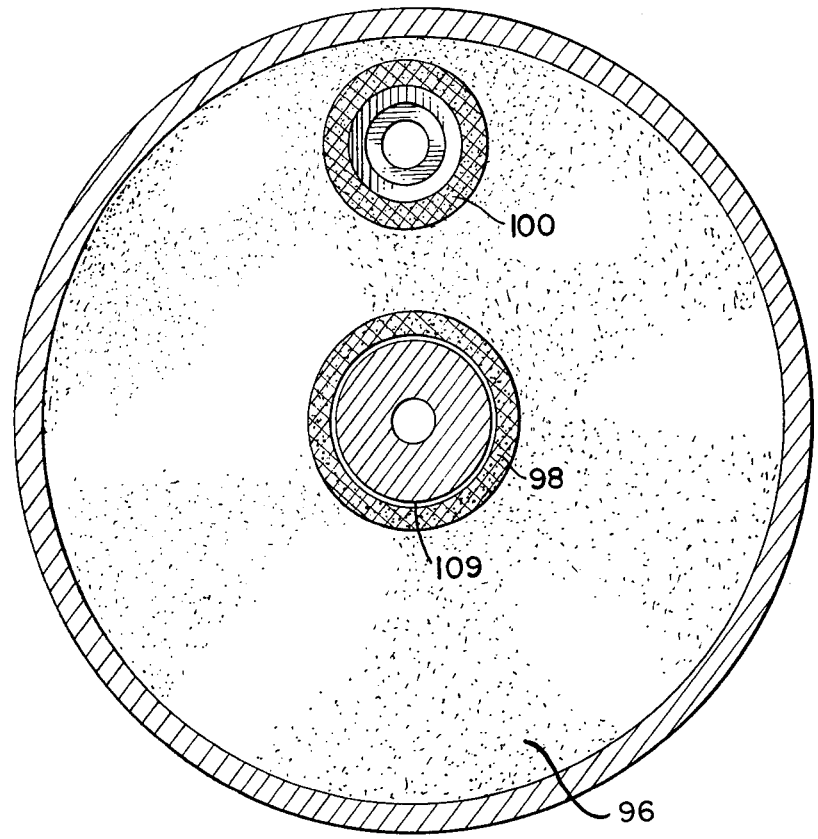
FIG. 4 is a transverse sectional view taken substantially on the lines 4—4 as shown in FIG. 3.
Figure 5:
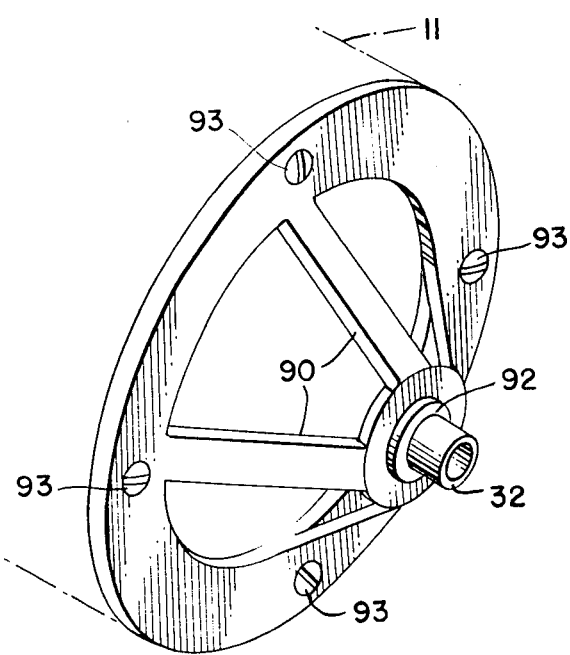
FIG. 5 is a perspective view that shows the use of a spider member in assembly of the rotary meter of this invention.

In accordance with the present invention, the self contained cartridge 23 is readily and accurately secured within the casing 11 to maintain a uniform running clearance between the rotor 25 vanes 38 and the cylindrical bore 12 of the casing 11 and between the gate 29 surface 54 and the surface 46 of the cylindrical bore 12. In accordance with this invention the self contained cartridge is also readily accessable for adjustment, such as the relative position of the gate 29 surface 54 with respect to the surface 46 of the housing 11 before the bonnet 16 is applied to the open end 14 of the casing 11. This is accomplished by placing the self contained cartridge 23 in the cylindrical bore 12 with the bonnet 16 removed such that the tapered back support journal 30 is received by the tapered support bore 82 in the base portion 13 of the casing 11. Before tightening the lock screw 84 to lock the cartridge 23 in place, a spider member 90 such as shown in FIG. 4 and disclosed in detail in U.S. Pat. No. 4,109,528 is temporarily attached to the open end 14 of the casing 11 by suitable fastening means 93 with the front support journal 32 being slidably received by a central opening 92 in the spider 90. The spider 90 enables the various running clearances to be measured and adjusted. Once the necessary measurements and adjustments have been made, the locking screw 84 is tightened to securely lock the self contained cartridge 23 within the cylindrical bore 12 of the casing 11 with the core member 25 being held stationary within the casing 11. The spider member 90 is then removed and replaced with the bonnet 16 with the front support journal 32 being slidably received by a central opening 88 in the bonnet 16. It is also noted that by not using separate covers, or bonnets, at each end of the casing 11, manufacturing tolerances are reduced and it is less difficult to maintain the correct running clearances between the cartridge 23 and the interior of the casing 11.

Figure 3:
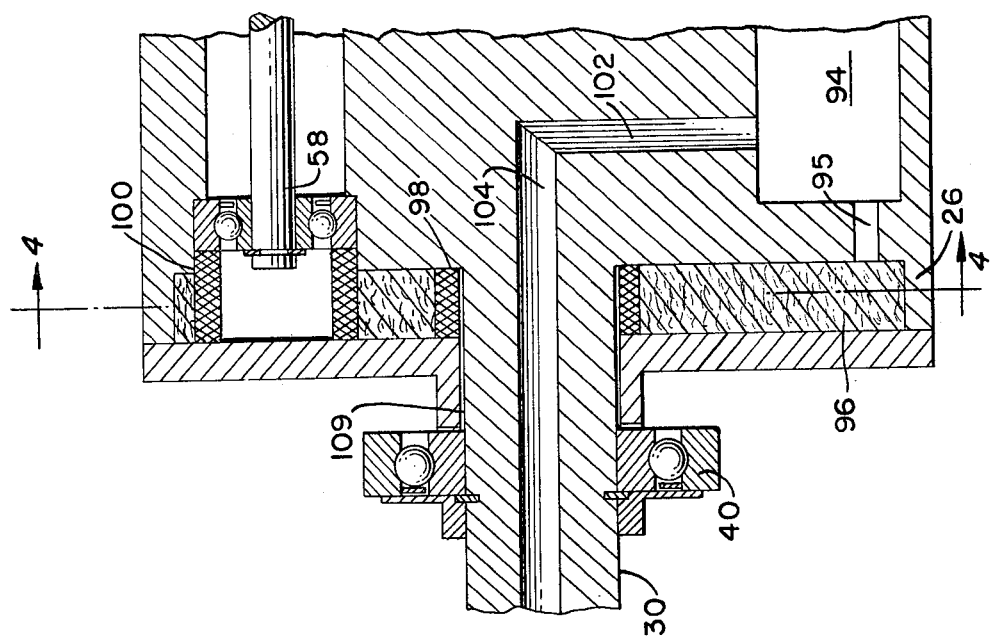
FIG. 3 shows, with greater clarity, a portion of the meter illustrated in FIG. 1.

In accordance with another aspect of this invention the rotor bearings 40 and 42 and the gate bearings 58 and 60 are lubricated by a suitable lubricant, such as oil, contained in a replenishable reservoir in the stationary core member 25. As shown in FIG. 1, the crescent shaped member 24 contains a hollow chamber 94 that is filled with oil. The oil filled chamber 94 communicates with the rotor 27 bearing 40 and the gate 29 bearing 58 by means of a passage in the back bearing plate 26 that includes a passageway 95 in the core 25, a felt wick 96 and porous metal or plastic sleeves 98 and 100. Similarly, the oil filled chamber 94 communicates with the rotor bearing 32 and the gate bearing 60 by means of a passage in the front bearing plate 28 that includes a passageway 97 in the core 25, a felt wick 99 and porous metal or plastic sleeves 101 and 103. The lubrication of the rotor 27 bearing 40 and the gate bearing 58 can best be understood from consideration of FIGS. 3 and 4, it being understood that the rotor 27 bearings 32 and gate bearings 60 are lubricated in a substantially identical manner. As best shown in FIG. 4 the felt wick 96 contained in the rear bearing plate 26 is generally circular and surrounds the annular porous sleeves 98 and 100. By means of capillary action, the felt wick 96 lifts oil from the oil filled chamber 94 to saturate the porous sleeves 98 and 100 which act as filters to prevent any contaminating particles in the gas stream from entering the lubricating oil system. Since the cartridge assembly 23 is under pressure of the gas being metered, the oil contained in the felt wick 96 and the chamber 94 will be saturated with gas. During operation of the gas meter 10 it is normal for the system to experience some occasional fluctuations in operating pressure. Accordingly any slight reduction in operating pressure will cause the gas saturated oil in the chamber 94 and felt wick 96 to expand slightly thereby forcing a small amount of the oil through the porous sleeves 98 and 100. In the case of the gate 29 bearing 58, the porous sleeve 100 is in direct contact with the bearing 58 and the oil which is forced through the porous sleeve 100 will flow into the outer race of the bearing 58 to provide sufficient lubrication. In the case of the rotor 27 bearing 40, the oil forced through the porous sleeve 98 will flow through the annulus 109 formed between the fixed back journal 30 and the back bearing plate 26 to the inner race of rotor 27 bearing 40 to provide sufficient lubrication.

As shown in FIG. 1, access to the chamber 94 from the exterior of the meter 10 to replenish the oil in the chamber 94 is provided by an oil lube fitting 106 secured to the base portion 13 of the casing 11. The lube fitting 106 communicates with the chamber 94 by way of a passage that includes a passge way 105 in the base portion 13 that connects to a passageway 104 in the back support journal 30 that in turn connects with a passageway 102 in the core member 25 that communicates with the chamber 94. A cap 108 which threadedly engages the base portion 13 of the casing 11 prevents dust, dirt and the like from accummulating at the lube fitting 106. As will be apparent, being able to replenish the oil in the chamber 94 to provide adequate lubrication during an indefinite time period is far superior to relying on bearings that are merely greased prior to sealing the meter 10 and regreased after disassembly of the meter 10.

Other embodiments and modifications of the invention described herein will be readily apparent to those skilled in the art without departing from the spirit and scope of this invention as defined by the following claims.

I claim:

1. A fluid meter comprising:
    a casing provided with a cylindrical bore to provide a base at one end thereof and an opening at the other end thereof;
    a fluid inlet and a fluid outlet spaced from said fluid inlet on said casing;
    an assembly contained within said cylindrical bore and including a stationary core member, a rotor and a rotatable cylindrical gate;
    said core member including a crescent shaped member that, with said cylindrical bore, defines an arcuate channel communicating with said fluid inlet and said fluid outlet;
    a cylindrical cavity intersecting the arcuate channel between said fluid inlet and said fluid outlet;
    means rotatably mounting said rotor on said core member and said rotor having a plurality of vanes extending axially through said arcuate channel to direct flow of fluid in the arcuate channel from the fluid inlet to the fluid outlet for measurement by the meter;
    said cylindrical bore having a central axis coincident with the axis of rotation of said rotor;
    means rotatably mounting said rotatable gate on said stationary core with said gate located within said cylindrical cavity and having at least one pocket in the outer periphery thereof;
    gear means coupling said rotor to said gate to effect synchronous rotation of said rotor and said gate to thereby assure periodic registry of the pocket(s) and the rotor vanes as the rotor and gate rotate in said casing with said gate functioning to seal said fluid inlet from said fluid outlet;
    an end cover secured to the open end of said casing;
    output means coupled to said rotor and extending through said end cover;
    said crescent shaped member being hollow and containing a lubricant therein; and
    passage means to communicate said means for rotatably mounting said rotor and/or said means for rotatably mounting said gate with said hollow crescent shaped member to effect lubrication of said means for rotatably mounting said rotor and/or said gate.

2. The rotary meter according to claim 1 wherein operating pressure fluctuations enable said lubricant to be applied to said means for rotatably mounting said rotor and/or said gate.

3. The rotary meter according to claim 1 wherein at least a portion of said lubricant passage means includes a porous means.

4. The rotary meter according to claim 3 wherein said porous means includes a felt wick.

5. The rotary meter according to claim 3 wherein said porous means includes a porous metal.

6. The rotary meter according to claim 3 wherein said porous means includes a porous plastic.

7. The rotary meter according to claim 1 wherein
    said stationary core has a support journal extending therefrom at the end thereof adjacent to said base of said casing;
    an opening in said base of said casing for receiving said support journal; and
    a passageway in said support journal and said base of said casing communicating with said hollow crescent member to enable the lubricant therein to be replenished.

8. The rotary meter according to claim 3 wherein lubricant from said hollow crescent shaped member is applied to said means rotatably mounting said rotor and/or said gate by way of said passage means by capillary action and pressure fluctuations in said meter.

9. A fluid meter comprising:
    a casing having a cylindrical bore to provide a base at one end thereof and an opening at the other end thereof;
    a fluid inlet and a fluid outlet spaced from said fluid inlet;
    said fluid inlet and outlet located between the ends of said casing;
    a self contained cartridge removably mounted within said cylindrical bore and including a stationary core member, a rotor and a rotatably cylindrical gate;
    said core member including a crescent shaped member that, with said cylindrical bore, defines an arcuate channel communicating with said fluid inlet and said fluid outlet;
    a cylindrical cavity intersecting the arcuate channel between said fluid inlet and said fluid outlet;
    means rotatably mounting said rotor on said core member and said rotor having a plurality of vanes extending axially through said arcuate channel to direct flow of fluid in the arcuate channel from the fluid inlet to the fluid outlet for measurement by the meter;
    said cylindrical bore having a central axis coincident with the axis of rotation of said rotor;
    means rotatably mounting said rotatable gate on said stationary core with said gate located within said cylindrical cavity and having at least one pocket in the outer periphery thereof;
    said means rotatably mounting said rotor and said means rotatably mounting said gate being lubricated;
    gear means coupling said rotor with said gate to effect synchronous rotation of said rotor and said gate to thereby assure periodic registry of the pocket(s) and the rotor vanes as the rotor and gate rotate in said casing with said gate functioning to seal said fluid inlet from said fluid outlet;

said core member having a first support journal extending from one end thereof and a second support journal extending from the other end thereof;

said first journal adapted to be received within a bore in said base of said casing with said second journal extending beyond the open end of said casing;

locking means contained in the base of said casing for locking said first journal in said base to thereby position said cartridge within said casing;

spider means having an opening therein for receiving said second journal and temporarily coupled to said open end of said casing to enable said cartridge to be accurately positioned within said casing before actuating said first journal locking means; and an end cover having an opening therein for receiving and second journal and secured to said open end of said casing after said cartridge has been accurately positioned within said casing and said spider means removed.

10. The fluid meter according to claim 9 wherein
said stationary core member includes a hollow portion having a reservoir of lubricant therein; and
passage means between said reservoir and said means for rotatably mounting said rotor and said gate to effect lubrication of said means rotatably mounting said rotor and said gate on said stationary core.

11. The fluid meter according to claim 10 wherein operating pressure fluctuations enable said lubricant to be applied to said means for rotatably mounting said rotor and said gate.

12. The fluid meter according to claim 10 further including porous means along at least a portion of said lubricant passage means.

13. The fluid meter according to claim 12 wherein lubricant from said hollow crescent shaped member is applied to said means for rotatably mounting said rotor and said gate by way of said passage means by capillary action and pressure fluctuations in said meter.

14. The fluid meter according to claim 10 further including a passageway in said first journal and said base of said casing communicating with said hollow crescent shaped member to enable the lubricant therein to be replenished.

15. The fluid meter according to claim 10 wherein said first support journal and said first journal receiving bore in said base of said casing are tapered.

16. The fluid meter according to claim 15 wherein said locking means includes a locking screw communicating with said tapered bore in said base of said casing by means of an opening in said base with said locking means threadedly engaging said tapered first journal.

17. The fluid meter according to claim 16 wherein the longitudinal axis of said locking screw is coincident with the longitudinal axis of said tapered first journal.

18. The fluid meter according to claim 9 wherein:
said second journal is hollow and is formed from a non-magnetic material;
an output shaft contained within said hollow second journal;
a cylindrical magnet located within said hollow second journal and secured to said output shaft; and
a ring magnet coupled to said rotor for rotation therewith;
said ring magnet surrounding said hollow second journal and magnetically coupled to said cylindrical magnet whereby rotation of said rotor causes corresponding rotation of said output shaft.

* * * * *